April 22, 1969  F. L. FORD  3,439,455
FENCE STRUCTURE

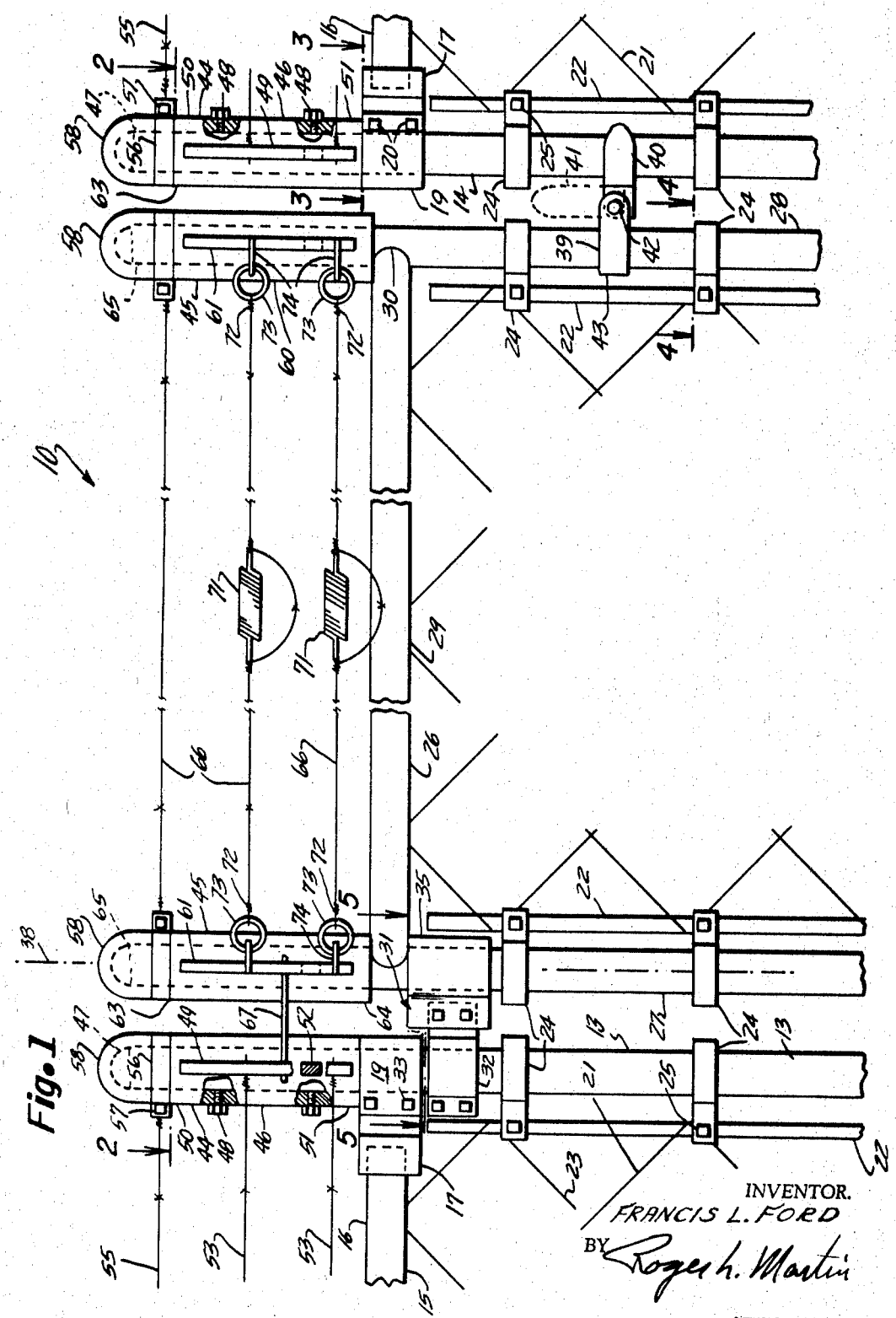

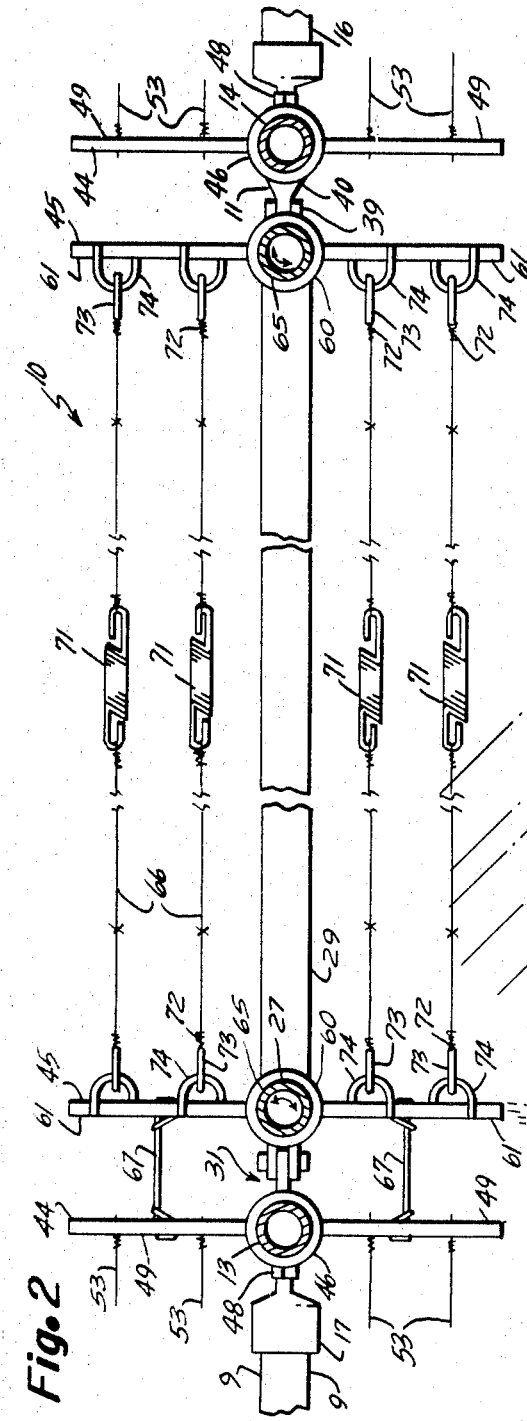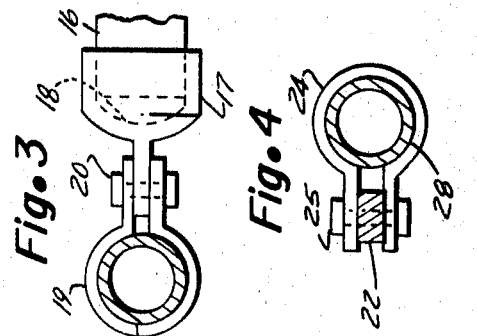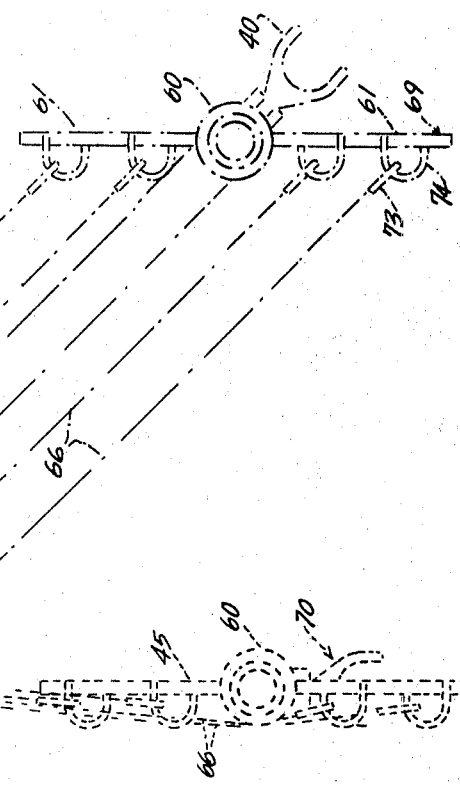

Filed Nov. 2, 1967

INVENTOR.
FRANCIS L. FORD
BY Roger L. Martin
ATTORNEY

United States Patent Office 3,439,455
Patented Apr. 22, 1969

3,439,455
FENCE STRUCTURE
Francis L. Ford, 1110 Raymond Ave.,
Fort Pierce, Fla. 33450
Filed Nov. 2, 1967, Ser. No. 680,121
Int. Cl. E06f *11/00*
U.S. Cl. 49—381                                5 Claims

ABSTRACT OF THE DISCLOSURE

The disclosure relates to fence structures and has to do with arm type barbed wire supports for fence posts and gate structures. Heretofore and use of arm type wire supports on gates has been precluded by the presence of the laterally extending arms of the wire support that is mounted on the gate post. When a similar arm support structure is used on a gate, the arms collide as the gate is opened because of the close proximity in the fence structure.

The arm type wire supports for the gate shown in the disclosure are mounted in the gate in a manner such that the arms remain parallel to the laterally extending arms of the wire support on the gate post as the gate is being moved between open and closed positions. The arrangement provided is one wherein the wire supports which are mounted in the gate are relatively pivotally movable with respect to the supporting gate frame and wherein the wire support in the gate which is adjacent the gate post is so located in the gate structure and so connected to the gate post as to remain substantially immobile with respect to the fence post as the gate is swung between open and closed positions therefor. The laterally offset wires in the gate are connected to the arms of the support therein in a parallelogram type arrangement with the arms and which keeps the wire supporting arms in parallel as the gate is caused to pivot during use. Springs are provided in the connecting wires on the gate structure to permit distortion of the wire lengths and a ring type connection involving annular segments fixed to the arms is used to enable the wires to pivot with respect to the supports in the parallelogram type arrangement.

Background of the invention

Arm type barbed wire supports for fences are known and basically include one or more arms and some type of means for mounting the arm or arms at the top of a fence post. The arm or arms of the supports extend laterally of the sides of the fence and the barbed wire is supported in a lateral position which is offset from the side of the fence so as to make it more difficult for trespassers to climb over the fence. In the past, the use of arm type wire supports has been limited to use on fence posts because when corresponding structure is placed on a gate frame, the arms carried on the gate frame in the proximity of the support arms mounted on the gate post collide as the gate is being opened. As a result, the use of barbed wire in the gate areas of fences is either omitted in practice, with the result that easy access to the enclosed area can be gained by simply climbing the gate, or else the barbed wire is strung between uprights in the gate frame structure and which are carried in the same general plane of the fence section when the gate is in the closed position. The latter type arrangement is much less satisfactory than when the barbed wire is offset laterally from the side of the main fencing material as is apparent to those skilled in the art.

Summary

The invention relates to fence structures and in particular has to do with gate structures and supports for barbed wire thereon.

A general object of the invention is to provide improved fence structures and in particular improved barbed wire support arrangement for gates.

A particular object of the invention is to provide an arrangement for supporting barbed wires in laterally offset position in gates and which enable the gates to be swung to open positions at which full use of the accessway through the fence can be realized.

Still a further object is to provide a wire supporting arrangement for gates and which enables barbed wire to be supported at the top of the gate in an offset manner which is commensurate with the pattern of barbed wire supported elsewhere in the fence structure.

In accord with the invention, the gate is provided with a pair of arm type wire supports which are mounted for pivotal movement relative to the gate frame and which are interconnected by supported wires on the gate in a parallelogram type arrangement. The wire support at the hinge side of the gate has a pivot axis which is coaxial with the pivot axis established by the hinge assembly for the gate, and is so connected to the gate post as to be secured against substantial movement relative to the post as the gate is caused to pivot about the axis of the hinge assembly. By virtue of the linkage to the gate post and the parallelogram type arrangement of the wires and laterally extending arms of the wire supports carried in the gate, the arms remain parallel to the wire support arms that are mounted on the gate post as the gate is being opened and closed.

One aspect of the invention has to do with the provision of yieldable means in the wire lengths that interconnect the arms of the wire supports on the gate and which permit the lengths to be distorted from the normal parallel arrangement of the wires when the wires encounter other structure at the fully opened position for the gate. Yet another aspect of the invention has to do with providing a slidable ring type connection at the ends of the laterally supported wires in the gate structure, the connection being one which establishes an axis for pivotal movement of the wire with respect to the connecting support arm and avoids wire damage that could occur with certain other types of arrangements.

The invention as well as other objects thereof will become more apparent from the detailed description which follows and wherein a preferred embodiment of the invention is fully described.

Brief description of the drawings

A preferred embodiment of the invention is illustrated in the accompanying sheets of drawings and wherein:

FIG. 1 is a side elevation of a fragment of a fence section embodying the concepts of the invention with the structure adjacent the ground being broken away.

FIG. 2 is a top view of the fence section seen in FIG. 1 with the view being partially in section as generally seen along the lines 2—2 therein, the figure also showing certain positions that are assumed by the wire supports on the gate when the gate is open.

FIG. 3 is a section taken generally along the lines 3—3 of FIG. 1 to illustrate a conventional method of securing a top rail to a fence post of the type illustrated in the drawings.

FIG. 4 is a section taken generally along the lines 4—4 of FIG. 1 and illustrates a conventional means used for securing certain tension bars to the gate frame.

*Description of preferred embodiment*

Figure 5:
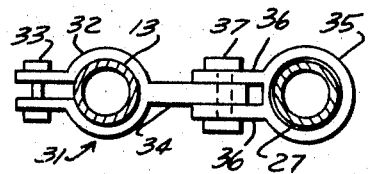
FIG. 5 is a view taken generally along the lines 5—5 of FIG. 1 and illustrates a conventional assembly used in hinging the gate frame to a gate post.

Reference is now made to the drawings and wherein a side section of a fence that embodies the concepts of the invention is designated generally at 10. The section 10 has an accessway or opening 11 to the area enclosed by the fence and also has a gate 12 which is seen in FIG. 1 in the closed position for obstructing passage through the opening. The side section 10 includes a gate post 13 and another fence post 14 which is spaced from the former to provide the opening 11 to the enclosed area.

Posts 13 and 14 are both suitably secured in the ground in the upright position shown. The fence has a top rail 15 that includes tubular sections 16 which extend between the adjacent ground posts of the fence section. These tubular rail sections 16 are supported in rail end cups 17 at posts 13 and 14, the cups being in common use and provided with a socket 18 in which the end of the section is disposed as seen in FIG. 3. The cups 17 are secured in the position shown and are fastened to the adjacent posts by means of band type posts clamps 19 to which the cups are bolted as by bolts 20.

Various forms of fencing may be used in the fence section 10, a woven type wire fencing material 21 being shown in the illustration. This fencing material 21 is secured to the upright posts 13 and 14 at the opposite sides of the opening 11 by means of an assembly that includes an elongated bar member 22 which is arranged upright and inserted between the bar strands adjacent the posts. The bar 22 is fastened to the adjacent post by means of band type clamps 24 that are vertically spaced on the post and bolted to the bar 22 by means of bolts 25.

The gate 12 illustrated in the drawings has a rigid frame component 26 that includes upright tubular side members 27 and 28 which are arranged in parallel upright positions and which are seen in FIG. 1 as being adjacent the gate and latching posts 13 and 14 respectively. These cylindrical members 27 and 28 are rigidly spaced apart in the illustration by a transverse top rail section of frame 26. Section 29 is welded at its opposite end 30 to the gate side members 27 and 28 in the illustration although various other forms of providing a rigid attachment will be apparent to those skilled in the art. Side members 27 and 28 extend above the rail section 29 as seen in the drawings and below the top rail section 29, the frame 26 is covered by fencing material that is secured to the side members 27 and 28 by means of the bar 22 and clamp 24 arrangement previously described.

Gate 12 is supported on the gate post 13 through a pair of vertically spaced hinges which establish a vertical pivot axis 38 about which the gate is pivotally movable, only the upper hinge of the assembly 31 being shown in the drawings. This upper hinge includes a post clamp 32 which is adapted to fit on the post 13 as seen in FIG. 5, and which is secured in position by bolts 33. The post clamp 32 has an integral plate section 34 which projects radially of the post 13, and here the hinge 31 is equipped with a cylindrical member 35 that loosely fits around the adjacent cylindrical side member 27 of frame 26. Member 35, as seen in FIG. 5, is provided with a pair of lugs 36 which are arranged to accommodate the plate section 34 therebetween, and here the parts of the hinge 31 are bolted together by bolts 37. The gate rail section 29 rests on the upper end of the cylindrical member 35, and the latter loosely fits around the side piece 27 so as to provide a sliding fit therebetween that enables the frame to swing about the vertical pivot axis 38 established by the hinges.

A latch mechanism 39 is provided on the opposite side member 28 of the gate frame. Mechanism 39 includes a conventional yoke piece 40 which is adapted to straddle the sides of the adjacent fence post 14 when the gate is closed. Yoke 40 is pivotally movable to the unlatched position, designated at 41, about the axis of a bolt 42 which pivotally connects the yoke to a clamp member 43 of mechanism 39. Clamp 43 as seen in the drawings is suitably secured to the adjacent side member 28 of the gate frame.

Now the barbed wire supports that are mounted on the fence post are alike in structure in the illustration and are designated at 44. The gate 12 on the other hand has a pair of wire supports which although similar to supports 44 are nevertheless somewhat modified in structure and are designated at 45.

The wire supports on the fence posts have a hollow cylindrical body member 46 which is adapted to slip onto the upper end 47 of the post as the fence is being assembled, and each body member is equipped with a pair of bolts 48 that are vertically spaced and threaded in suitable threaded openings in the wall of the member 46. The bolts function as set screws and engage the posts in the hollow of the member 46 to securely fasten the support to the post. Each support also has a pair of elongated rigid arms 49 which are welded to the opposite sides of the body member 46 and these arms 49 are arranged in the fence section to extend laterally of the opposite sides 9 of the assembled section 10. The arms 49 are illustrated as inclining downwardly in the lateral directions from the upper ends 50 of the body member and as being rigidly braced in their lateral positions at the lower end 51 of the body by horizontal braces, designated at 52. The arms of the wire supports 44, as well as those of the pivotal wire supports 45 on the gate frame may of course be otherwise arranged, as for example to incline upwardly from the bottom ends of the body member, or for that matter horizontally from the body member as will be readily apparent to those skilled in the art.

Arms 49 of the wire support 44 extend laterally of the general plane of the fence and are used to support barbed wire lengths 53 at the opposite sides of the fence and which of course are generally arranged in parallel and offset laterally of the opposite sides 9 of the fence section. The barbed wire lengths 53 may be fastened to the arms 49 in various well known ways but in the illustration the arms are provided with suitable holes 54 to facilitate the end attachments of the lengths 53 on the arms of the wire support members 44. The fence section 10 also has a top strand 55 of barbed wire in the illustrated embodiment. Posts 13 and 14 are both equipped with a suitable band type fastener 56 similar to that employed for fastening the bar members to the posts, and which is clamped to the post at the upper end of the lateral wire supports 44 by bolts designated at 57 and to which the strands are fastened. Above each of these fasteners 56, each of the posts 13 and 14 is equipped with a socket containing end cap 58 that is pressed fit on the upper end of the post.

The lateral wire supports 45 of the gate 12 are similar to the lateral wire supports 44 for the fence posts in that each support 45 has a hollow cylindrical body portion 60 and a pair of laterally extending arm members 61 which are fixed at the opposite sides of the upper end 63 of the body member and rigidly braced at the lower end 64 of the body by horizontally extending brace members 62. Like the wire supports 44 for the fence posts, the arms 61 are welded at the upper end 63 of the body member 60 and each arm 61 extends laterally thereof in a generally downwardly inclined arrangement so that the barbed wire lengths 66 on the gate follow the general pattern and arrangement of the laterally offset lengths 63 elsewhere in the fence section.

In the assembled fence, the gate is provided with a pair of wire supports 45 as seen in FIGS. 1 and 2, and these supports 45 are mounted on the cylindrical side members 27 and 28 of the gate frame 26. The arrangement is such that the upper end 65 of cylindrical members 27 and 28 extend through the hollow of the cylindrical body portion 60 of the supports 45 in the assembled gate. The body portions 60 of the wire support 45 rest on the opposite ends of the gate rail section 29 in the assembled gate. The upper ends 65 of the members 27 and 28 loosely fit in the sleeve like body portion 60 so that each support is pivotally movable with respect to the gate frame about the longitudinal axis of the side member associated therewith. The arrangement is such that the body portions 60 slide on the rail ends when the supports pivot with respect to the frame, as for example as the gate is caused to pivot about its pivotal axis 38. In this respect it will be noted that the body portion of the support 45 on frame side member 27 is coaxially with the pivot axis 38 for the gate. This arrangement enables the support to be secured against substantial movement relative to the gate post, as will be seen subsequently and yet permits the frame to pivot about the axis of the hinge.

The barbed wire lengths 66 on gate 12 are arranged in parallel and are offset laterally from the opposite sides 9 of the fence. The lengths 66 are connected to the arms 61 of the supports 45 as seen in the drawings, and the arrangement is such that each of the arms 61 of each support 45 is maintained in parallel with the corresponding arm 61 at the same side of the fence of the other support 45, as the gate is caused to pivot about its pivot axis.

Figure 6:
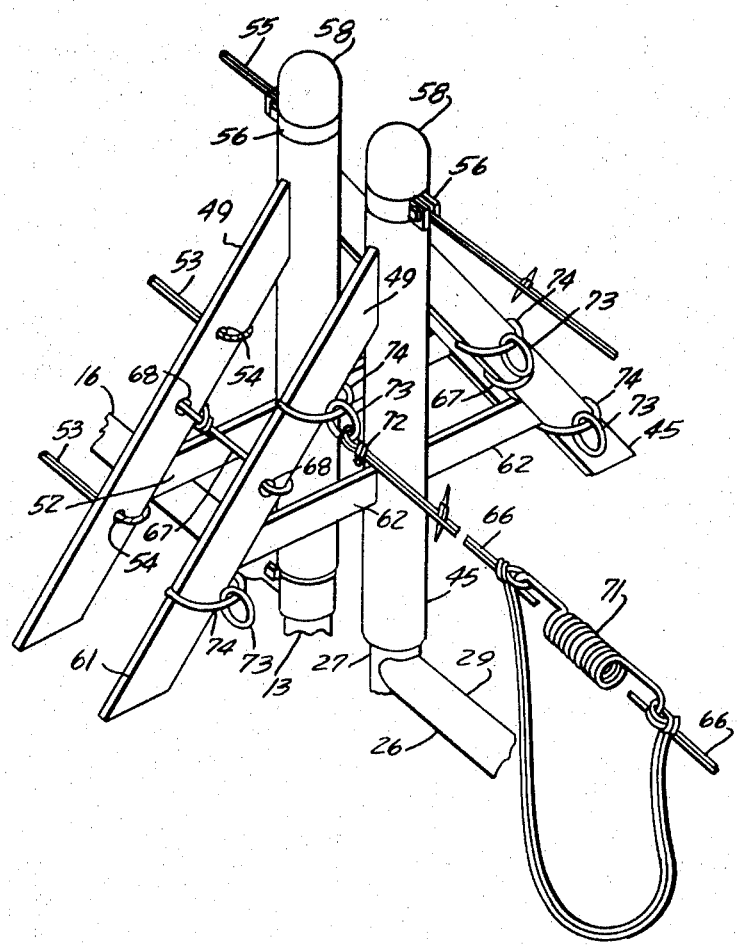
FIG. 6 is a perspective view of the arm type wire support at the hinge side of the gate and of the adjacent wire support on the gate post along with adjacent structure, and serves in part to better illustrate the arrangement at this side of the gate and certain springs that are used for maintaining the laterally supported wires under tension in the illustrated embodiment.

The wire support 45 at the hinge side of gate 12 is connected to the gate post 13 through the lateral wire support 44 carried on the post 13 and in a manner such as to prevent the support 45 adjacent the post 13 from pivoting with respect to the gate post about the pivot axis 38 as the gate is opened and closed. Because of this connection which secures the support 45 at the hinge side of the gate against substantial movement relative to the post, and because of the parallelogram type ararngement involving the support arm 61 and the laterally supported wires 66, the arms 61 of the pair of supports 45 are maintained in parallel with the arms 49 of supports 44 at the corresponding sides of the fence as the gate is caused to pivot about the axis 38. The connection is accomplished in the illustration by tying the adjacent arms 49 and 61 of the wire support 44 on the gate post 13 and of the wire support 45 adjacent the post 13 together, as by means of suitable lengths 67 of wire at the opposite sides of the fence. To facilitate the tie-in of the adjacent arms, and which of course may be done in various ways that will readily occur to those skilled in the art, the arms are drilled with suitable holes 68 to receive the ends of the wire lengths 67 as seen in FIG. 6.

Overall, the wire support arms 44 and 45 on the fence posts and gate structure are mounted in a manner such that those arms at the same side of the fence section remain generally in parallel, as seen in the top view of FIG. 2, as the gate is swung to an open position such as indicated at 69. As this happens it will be noted that the upper end of frame member 27 pivots with respect to the wire support mounted thereon since the latter is secured against pivotal movement with the frame by virtue of its connection through wire length 67 to the wire support 44 on the gate post. On the other hand the wire support on member 28 pivotally moves with the gate frame and is caused to pivot about the axis of member 28 by virtue of the connecting wire lengths 66 and which serve to control the pivotal movement of the support at the latch side of the gate as the gate is caused to pivot about axis 38.

As the gate is swung to a 90 degree position indicated at 70, at which full use of the opening 11 can be realized, the laterally supported wires 66 on the gate encounter the cylindrical body portion 60 of one of the supports 45, as illustrated by reference to the arrangement indicated at 70 in FIG. 2. This would normally put an undue strain on the laterally supported barbed wire lengths 66 and which could break the wires or distort the shape of the supports 45 or gate frame. To prevent this from happening, a tension spring 71 is tied into each laterally supported wire length 66 so as to enable the length to yield and become distorted from its normal straight position as the length encounters the body portion at the 90 degree position. The tension spring 71 serves to maintain the wire under tension but yields to strains that are imposed upon the wire when the gate is swung to the fully opened position 70 and at which the wire encounters the body portions 60 of the wire supports 45 and are distorted. The wires 66, as seen in the drawings, are preferably attached to the arms 61 in a loosened condition as the gate is assembled. The springs thereafter are attached to the lengths 66 to take up the slack. This provides a loop of slack wire as seen in FIG. 6 and prevents a would be trespasser from merely removing the spring in order to remove the obstructing wire length.

Various means for connecting the ends of the wires 66 to the arm 61 of the lateral wire supports 45 may be employed. In the preferred arrangement, the arms 61 are equipped with annular segments 74 that are appropriately welded in horizontal positions in the arm, and each segment 74 engages a ring element 73 which is capable of sliding on the segment about the vertical axis through the center of the segment. The wire ends 72 are tied to the rings 73 so that barbed wire lengths 66 pivot with respect to the arms 61 about the axes of the segments as the gate is caused to move about axis 38. This arrangement for connecting the wire ends 72 to the arms is preferred to avoid other arrangements where wire ends would be subjected to abrasion or bent during pivotal movement of the frame. With the ring type method illustrated in the drawings for fastening the lateral support wires 66 to the arms 61, subjection of the length 66 to severe and continuous bending which would do damage to the wire is avoided and instead the ring 73 slides on the segment 74 as the gate is swung open or closed and absorbs the wear.

In addition to the lateral wire sections 66, the gate illustrated is also provided with a top wire 75 that is suspended between frame side pieces 27 and 28. This top wire is secured above the wire arm supports 45 by end clamps 56 that are clamped to the frame structure by bolts 57 and to which the wire ends are fastened. The lateral wire supports 45, of course are relatively pivotally movable on and with respect to the side members 27 and 28 above the rail section, and end caps 58 are also provided in the gate structure at the upper ends of sections 27 and 28 as seen in the drawings.

From the foregoing description, it will be apparent that an arrangement is provided for supporting wires laterally of the sides of the fence and gate component and in a manner such that a gate can be opened to permit full use of the available accessway without interference from the lateral wire supporting structure on the adjacent gate post. By virtue of the arrangement the support arms 61 for the gate wires 66 normally extend laterally of the fencing when the gate is in the closed position and support the wires in positions which are generally offset from the general plane of the fencing. On the other hand as the gate 12 is swung to the fully opened position 70 the upper ends 65 of the frame side members turn in the hollows of the cylindrical body 60 so that the arms are ultimately drawn into a generally coplanar relation when the gate is at the 90 degree position that enables full use of the accessway.

What is claimed as new and what is desired to secure by Letters Patent of the United States is:

1. A fence section having opposite sides and an opening, and comprising: a gate post at the opening, a gate hinged to the gate post for pivot movement about a pivot axis and being arranged in a closed position in the opening, and a pair of wire supports supported on the gate with one of said supports being secured against substantial movement relative to said gate post and being arranged on the gate so that, as supported thereby, the gate is pivotally movable with respect to said one of said supports, and the other of said supports being pivotally movable with the gate about said axis and being mounted on the gate for pivotal movement with respect to the gate about another axis that is parallel to said pivot axis; parallel lengths of barbed wire respectively laterally offset from said opposite sides and interconnecting said supports, said lengths being arranged to control the pivotal movement of said other of said supports as said gate is pivotally moved about said pivot axis.

2. A fence section in accord with claim 1 wherein said lengths have yieldable means of maintaining said lengths under tension.

3. A fence section having opposite sides and an opening, and comprising: a gate post having a wire support fixed at the top thereof and which includes a pair of arms that respectively extend laterally of the opposite sides of the section, a gate arranged in a closed position in the opening and hinged to the gate post for pivotal movement about a vertical pivot axis, said gate including a rigid frame having upright, cylindrical, opposite side members which are spaced apart in a parallel arrangement and which include one side member that is in a coaxial arrangement with said pivot axis at the inside of the gate, a pair of wire support components supported by the frame and respectively mounted on said opposite side members, each of said wire support components having a cylindrical hollow body portion which is coaxially arranged with the side members associated therewith extending through the hollow thereof and which is adapted for relative pivotal movement with respect to and about the axis of the member, each of said wire support components further having a pair of arm members which are fixed to the body portion and respectively extend laterally of the opposite sides of the fence section and which are respectively parallel to the arms of the gate post wire supports, means securing the one of said support components that is mounted on said one side member against substantial movement relative to said gate post to thereby retain in the arm members of said one of said support components in parallel with the respective arms of the gate post wire support as the gate is pivotally moved about said pivot axis, and parallel lengths of barbed wire respectively laterally offset from the opposite sides of the fence section, said lengths being supported by said support components and each of said lengths being fastened at its opposite ends to the respective ones of the arm members which extend laterally of the fence sides associated therewith, whereby said lengths control the pivotal movement of the other of said wire support components as the gate is pivotally moved about said pivot axis.

4. A fence section in accord with claim 3 wherein each of said lengths have a spring element that maintains the length under tension and which is yieldable to permit distortion of the length.

5. A fence section in accord with claim 3 wherein each of the arm members of said pair of wire supports is equipped with slidable means establishing a vertical axis for pivotal movement with respect to the arm member of the wire length fastened thereto.

References Cited

UNITED STATES PATENTS

| | | | |
|---|---|---|---|
| 251,728 | 1/1882 | Patterson et al. | 49—191 |
| 310,408 | 1/1885 | Gibson | 160—328 |
| 763,499 | 6/1904 | Mills | 49—191 |
| 1,480,501 | 1/1924 | Bryant | 256—39 X |
| 2,743,125 | 4/1956 | Wagner | 160—328 X |
| 2,895,716 | 7/1959 | Veltri | 256—39 X |

DENNIS L. TAYLOR, *Primary Examiner.*

U.S. Cl. X.R.

256—11